(No Model.)  7 Sheets—Sheet 1.

E. W. LOCKE.
MACHINE FOR MANUFACTURING WOODEN BOXES.

No. 390,493.  Patented Oct. 2, 1888.

Fig. 1

Witnesses  Inventor
L. J. Brown  Edward W. Locke,
Estelle H. Brown  Attorney Ellis Spear (No Model.) 7 Sheets—Sheet 2.
E. W. LOCKE.
MACHINE FOR MANUFACTURING WOODEN BOXES.
No. 390,493. Patented Oct. 2, 1888.

Attest:
Walter Donaldson
F. L. Middleton

Inventor
Edward W. Locke
Ellis Spear
Atty (No Model.) 7 Sheets—Sheet 3.

E. W. LOCKE.
MACHINE FOR MANUFACTURING WOODEN BOXES.

No. 390,493. Patented Oct. 2, 1888.

Attest:
Walter Donaldson
F. L. Middleton

Inventor
Edward W. Locke
Ellis Spear
Atty (No Model.) 7 Sheets—Sheet 4.
E. W. LOCKE.
MACHINE FOR MANUFACTURING WOODEN BOXES.

No. 390,493. Patented Oct. 2, 1888.

(No Model.) 7 Sheets—Sheet 6.

E. W. LOCKE.
MACHINE FOR MANUFACTURING WOODEN BOXES.

No. 390,493. Patented Oct. 2, 1888.

Attest
Walter Donaldson
F. L. Middleton

Inventor
Edward W. Locke
Ellis Spear
Atty (No Model.)  
7 Sheets—Sheet 7.

E. W. LOCKE.
MACHINE FOR MANUFACTURING WOODEN BOXES.

No. 390,493. Patented Oct. 2, 1888.

Attest:  
Walter Donaldson  
F. L. Middleton

Inventor  
Edward W. Locke.

UNITED STATES PATENT OFFICE.

EDWARD W. LOCKE, OF GRAND RAPIDS, MICHIGAN, ASSIGNOR OF ONE-HALF TO EDWIN DENSMARE, OF SAME PLACE.

MACHINE FOR MANUFACTURING WOODEN BOXES.

SPECIFICATION forming part of Letters Patent No. 390,493, dated October 2, 1888.

Application filed November 14, 1887. Serial No. 255,094. (No model.)

*To all whom it may concern:*

Be it known that I, EDWARD W. LOCKE, of Grand Rapids, in the county of Kent and State of Michigan, have invented a new and useful Improvement in Manufacture of Wooden Boxes; and I do hereby declare that the following is a full, clear, and exact description of the same.

My invention is an improved machine for making wooden boxes, and is of that class in which the boxes formed are of veneer or hoop coiled about a mandrel.

The invention includes mechanism for coiling the hoop about the mandrel and for inserting the bottom, mechanism for securing the ends of the hoop or veneer, mechanism for removing the mandrel after the ends of the hoop or veneer are secured, and mechanism for discharging the box.

I have hereinafter explained the general organization of the machine in connection with details of construction supplementary to the general organization, and have illustrated the whole in the accompanying drawings, in which—

Figure 1:
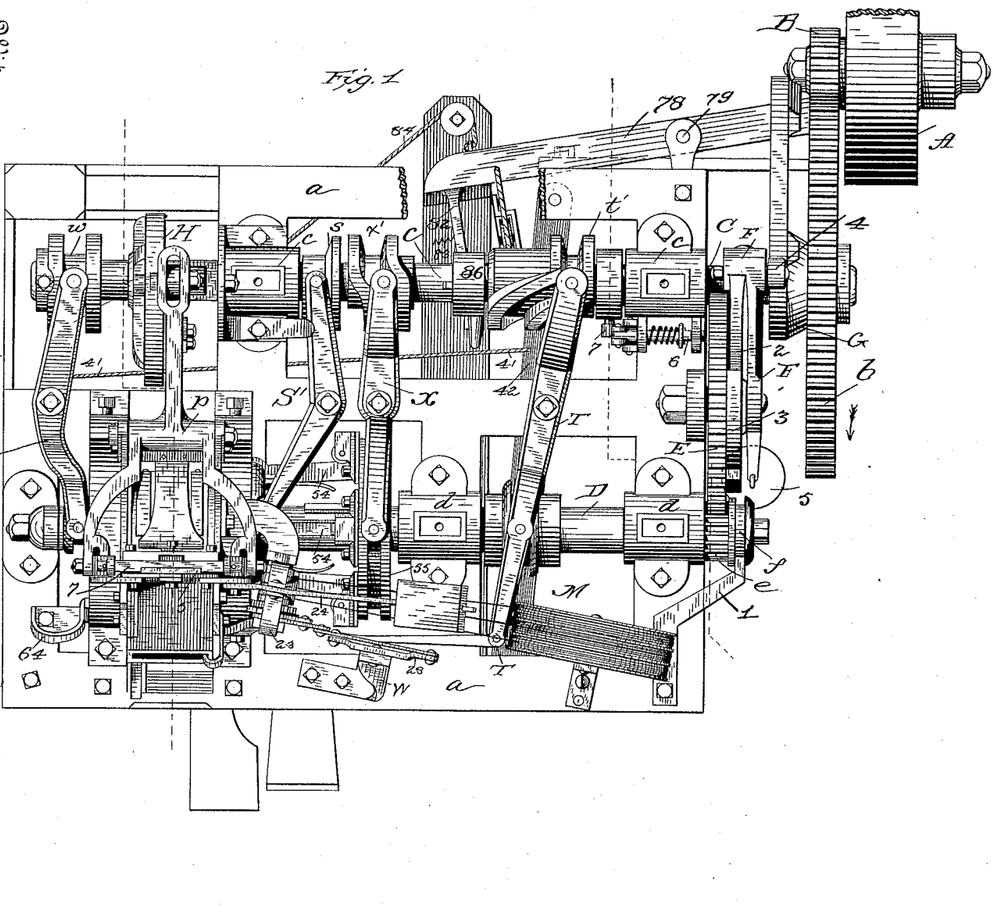
Figure 1 is a plan view of the entire machine, and the various parts being in position ready to commence the work of forming the box.
Figure 2:
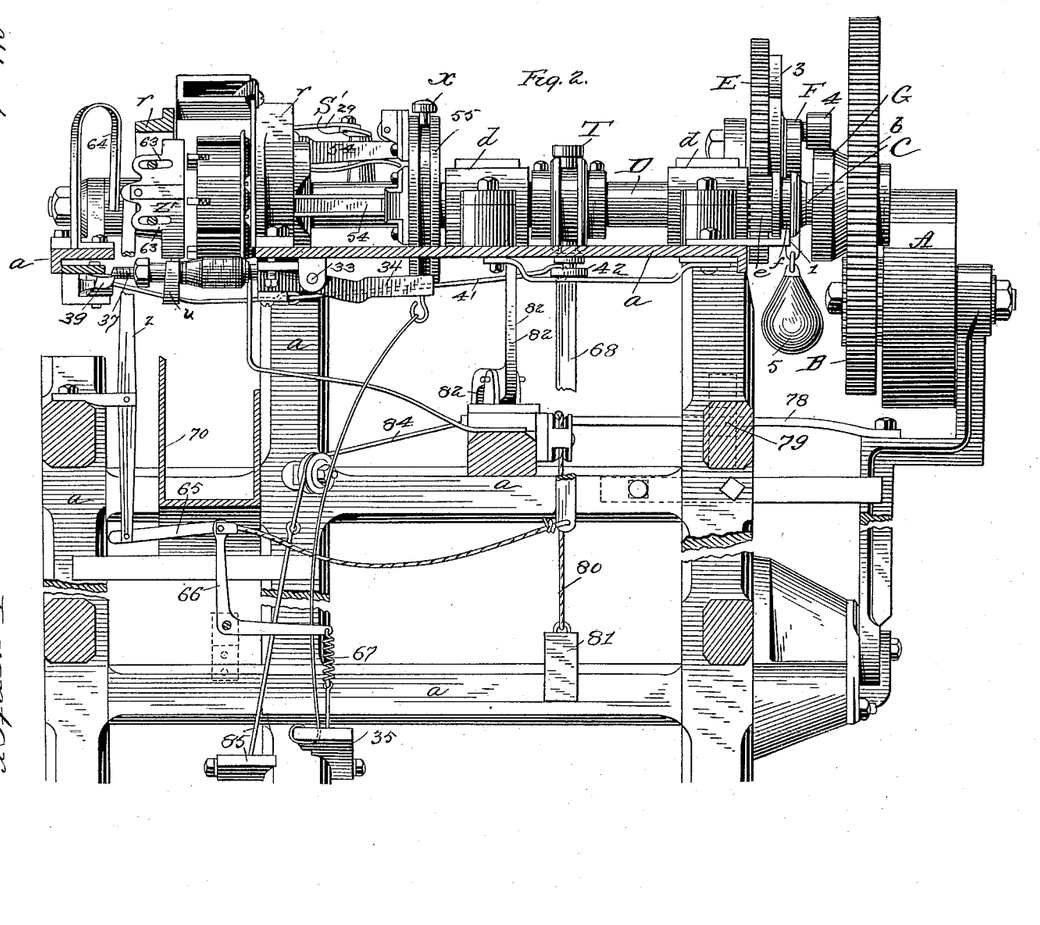
Fig. 2 represents a front view of the machine, with the parts of the mechanism in a similar position to that shown in Fig. 1, portions of the supporting structure being removed for convenience of illustration.
Figure 14:
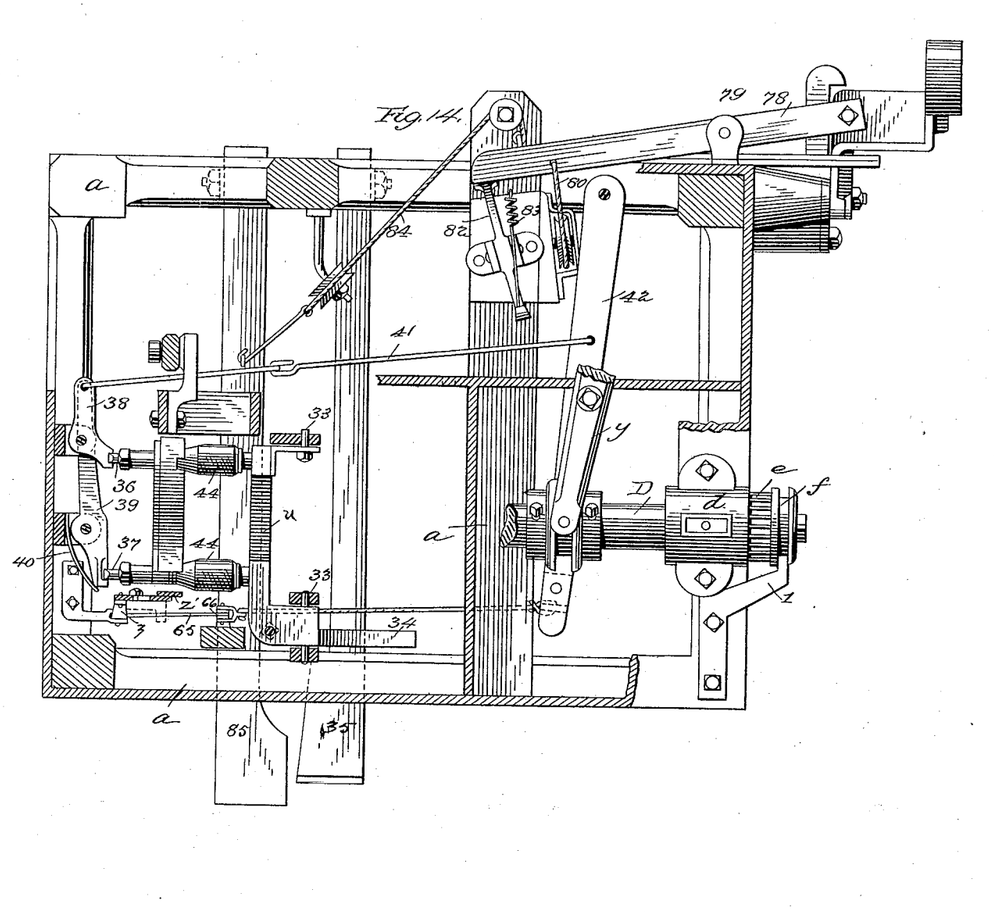
Fig. 14 is a plan view of the machine with the upper portions of the mechanism removed.

The frame-work which supports the operating parts of the machine and the general arrangement of these parts are shown in the plan view of Fig. 1, and also in Figs. 2 and 14. This frame-work is indicated at $a$, placed on the different parts. The frame is made of a height suitable for the attendant who stands in front of it, or before that side shown in the partly-sectional figure.

Power is applied to the machine through the pulley A, which carries a pinion, B, mounted on a rocking standard, hereinafter more fully described, meshing at the proper interval with the gear-wheel $b$ on the main shaft C. This main shaft carries the cams and cam-grooves, which impart motion to the various mechanisms hereinafter described. The main gear-wheel $b$ turns in the direction of the arrow placed thereon in Fig. 1. The shaft C turns in bearings $c$ upon the upper and rear part of the frame of the machine. In the same plane therewith, near the front of the frame, is another shaft, D, which carries the collapsible mandrel and turns in bearings $d\ d$. This shaft has an intermittent rotary and an intermittent longitudinal movement, the latter being also a reciprocating movement for the purpose of putting the mandrel in place to wind the hoop or veneer thereon, or to withdraw it from place when the box is finished. The intermittent rotary movement of the shaft D is for the purpose of winding the hoop or veneer upon the mandrel. In Figs. 1 and 2 the mechanism is shown in position to receive the strip preparatory to making the box—that is to say, the mandrel is pushed forward into position, is expanded, the bottom is in place, (shown in Fig. 10,) and the mechanism is at the point where further movement will commence to rotate the shaft D. The shaft D is reduced at the right-hand end, as shown in Fig. 1, and is splined through a sleeve, part of which forms a cog-wheel, $e$, and part of which has a groove, $f$, in which fits the spur of an arm, 1, fixed on the frame to hold the sleeve in position. The gear-wheel E turns on the stud in the frame, and is in mesh constantly with the pinion $e$, and it is rotated intermittingly by means of a lever, F, carrying a pawl, 2, which engages with teeth in a ratchet-wheel, 3, fixed to the side of the gear-wheel E. The lever F is pivoted concentrically with the wheel E, and has a pin carrying a friction-roller, 4, projecting laterally into the path of a cam, G, on the main shaft C. A partial revolution of the shaft C causes the cam G to raise the lever F and impart a partial rotation to the gear-wheel E. The parts are so adjusted that this partial rotation of the wheel E imparts exactly a complete revolution to the shaft D and its mandrel. The lever F drops back as soon as the friction-roller 4 has reached the highest part of the cam G, and this movement is accelerated by a weight, 5, hung in the bent tail of the lever.

In order that the movement of the gear-wheel E may be perfectly accurate in respect to its starting and stopping, I provide a spring-bolt, 6, Fig. 1, set on the frame at right angles to the inner face of the wheel and adapted to shoot into holes in said inner face, which holes are accurately placed at the stopping and starting points of the wheel. The bolt 6 is withdrawn by means of a stud, 7, set upon the main shaft C. This stud is set so as to remove the bolt from the hole and allow the cam G to start the wheel at the proper instant, and the bolt is pressed against the face of the wheel E during its movement and rides on the face until it reaches the hole set precisely to arrest the movement of the shaft D and its mandrel at the proper point for the stapling of the lap portions of the hoop or veneer. The shaft D and mandrel remain otherwise inactive during this part of the operation.

Figures 6, 7, 8, 9:
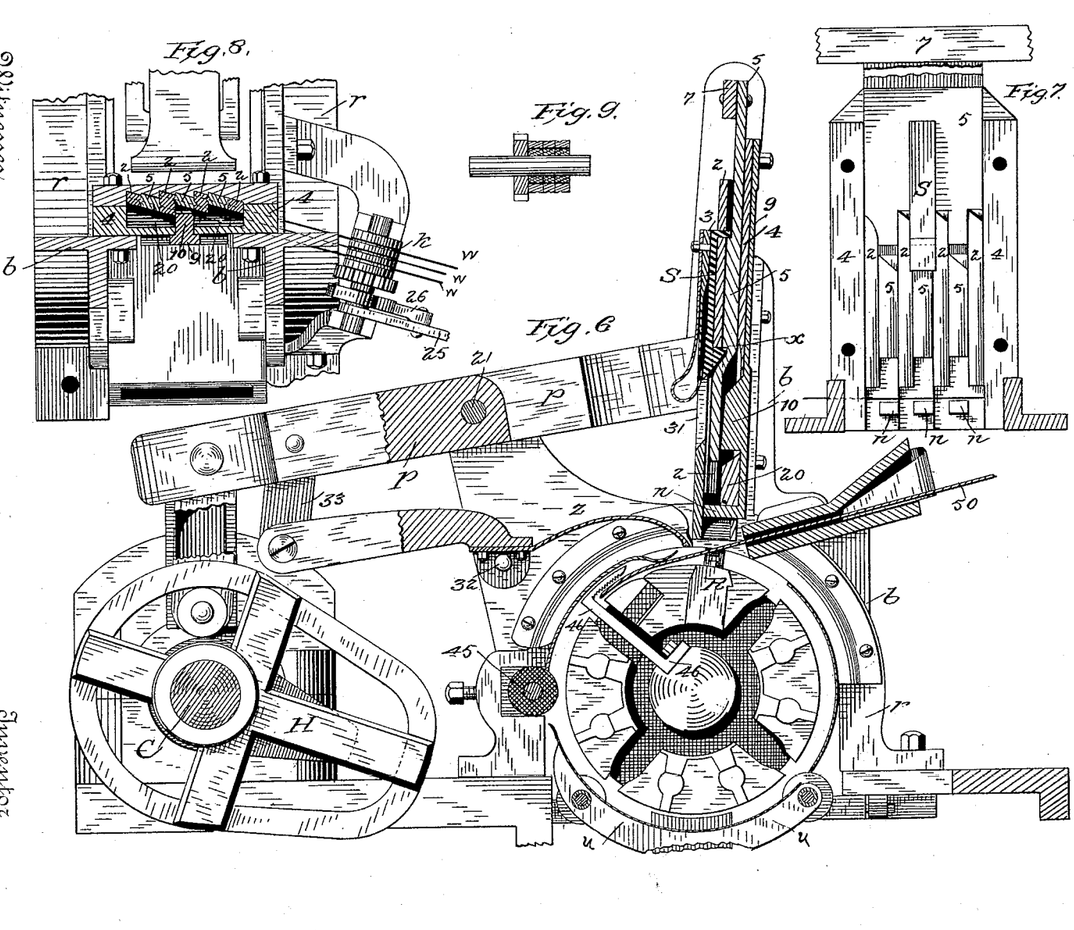
Fig. 6 shows a section of the mandrel and stapling devices.
Fig. 7 is an elevation of the prongs which form, guide, and drive the staples.
Fig. 8 shows a horizontal section of the same with adjacent parts in plan.
Fig. 9 shows a section of the lower feed-rollers.

The material of which the boxes made upon this machine are composed is best held together by staples or bridge-tacks, which may be made from a coil of wire; and to facilitate the working I have devised a mechanism for taking the wire from the coil and forming the staples and then inserting them through the lapping portions of the hoop which forms the walls of the boxes by a continuous operation. The principal part of the mechanism is shown in Figs. 6, 7, and 8.

On arches $r$ $r$, supported upon the frame of the machine, are fixed ribbed standards $b$ $b$, which support the mechanism for forming and inserting the staples. these standards being on each side of the mandrel on which the hoop is wrapped and stapled. A recessed base-plate, 4, is bolted to vertical ribs on this standard, the recesses in said plate being fitted to receive the working parts hereinafter described. The mechanism is designed to form three staples from three wires led from the reel, the staples being formed in position directly over the point where they are to be inserted in the hoop. At the lower end of this base-plate and in the recess is riveted a plate of steel having angular grooves planed across it vertically from top to bottom. These grooves receive the prongs hereinafter described, and the angular form is to give an angular and stepped arrangement of these prongs which admits of the formation of a plurality of staples made out of wire brought from one drum. This plate (marked 20) is made of steel, in order to have a steel face for the wire, which comes through horizontal holes in the plate, as shown in Fig. 6. The three wires shown are marked $w$ in Fig. 8, and they are led in diagonally to the devices which cut and form the staples. The devices which sever the wire serve also to guide and bend the severed pieces to form the staples and to move them downward, this acting in connection with a driving mechanism. Fig. 8 shows more clearly a horizontal section of this device. In this, 2 indicates the guiding and bending prongs, of which the first, on the right hand, having a sharp edge, severs the wire by a shearing action against the inner face of the recessed plate 4. The second prong 2, toward the left, severs the second wire in the same way against the face of the steel plate 20, and the third prong 2, farther to the left, severs the third wire in the same way. Between the first and second of these guiding and bending prongs is a driving-prong, 5, between the second and third of the guiding and bending prongs is a second driving-prong, and between the third and fourth guiding and bending prongs is a third driving-prong (all marked 5)—that is to say, each driving-prong moves between two guiding and bending prongs, forming a set, and these sets, arranged diagonally in parallel lines, are in line with their respective wires, as shown clearly in Fig. 8. The driving-prongs are made by dividing a plate, 5, from the lower end up to a point, $x$, Fig. 6, by planing slots to that point of the same width as the guiding-prongs 5. These prongs are then given a partial twist, which causes them to conform in position to an angle of the steel plate 20. The plate and prongs formed thereon are marked with the same figures 5. An offset is formed in the plate, of its own thickness, at the termination of the slots, so that the plate 2, which carries the guiding and bending prongs, lies against the face of the plate 5 and may bring its prongs between the prongs 5. The edges of each of the driving-prongs have small ribs that fit into small vertical grooves in the inner edge of each of the guiding-prongs, and thereby the driving-prongs are guided accurately in their movement. The same grooves also form guides for the prongs of the staples as they are formed and pressed downward. The bending is performed by the guiding and bending prongs in connection with horns $n$. (Shown in Figs. 6 and 7.) These horns are on the lower end of the plate 9, which is secured to the standard-frame. The horns are formed of portions of the lower ends bent at right angles, and they are the same width as the driving-prongs. They pass through mortises in the base-plate 4 and steel plate 20 and across the groove in which the bending and guiding prongs and also the driving-prongs work up and down. The plate 9 is made thin in its upper part, so as to act as a spring-plate and to be pressed back at the bottom. It also has an inner lug, 10, which passes through a vertical slot made centrally in the base-plate 4 and above the projection of the steel plate 20, as shown in Fig. 6. The upper part of this projecting lug 10 is beveled at an angle to conform to the angle made by the offset in the plate 5, so that when the plate 5 is pressed downward the bevel of the offset in the plate 5 strikes the bevel on the top of the lug and forces the spring-plate backward, carrying with it the horns $n$.

It will be apparent that the three pieces of wire after they are severed by the bending-prongs lie across the upper faces of the horns. The further advance of the bending-prongs bends down the ends over the horns, forming staples with downwardly-projecting prongs lying across the sides of the horns and in the grooves of the guide-prongs. After the bending-prongs have advanced far enough to complete this work, it is necessary that their advance should be arrested, while the driving-prongs, which have moved with the guiding and bending prongs, should continue their movement in order to drive the staples. The movements described require, therefore, that the plate 2 should be released at this point while the plate 5 continues its advance.

The plate 2 is formed of steel and its prongs are formed to correspond with those of plate 5, matching in width the spaces and the horns, and from the line of the upper ends of the grooves the plate is of the same thickness as the plate 5. Another groove is formed directly above the middle slot of about half the thickness of the plate, and at the upper end of this groove is a square mortise across the plate the same width as the width of the groove and about two and a half inches from the upper end of the middle slot. This holds the hooked strip of steel S, which is held in place by a thin strip of steel of the same thickness as the groove which is riveted to the plate 5. When the plates are up, the hook on the lower end of the steel strip will fit closely through the upper end of the middle slot and lock the two plates firmly together as they move up and down.

It will be observed that after the bending-prongs have advanced far enough to complete their work it is necessary that the horns should be withdrawn, so as to allow the staples within the guide-prongs to pass down to the surface of the box to be fastened. This is accomplished by the offset on the plate 5, as heretofore explained. At this instant the hook S, having already touched upon the incline in the cap-plate 3, is withdrawn from plate 5, so that the latter can continue and finish driving the staples. Over the rear is placed a cap-plate, 3, the inner face of which is planed at the lower end to match the outer faces of the prong-plates 2 and 5, and the upper half has a groove in the middle of its inner face of the same width as the hooked strip S. The lower end of this groove is cut through, as shown at 31 in Fig. 6. The lower end of this opening is beveled, inclining outwardly, so that when the plates 2 and 5 are pressed down together, the plate 5 carries with it the plate 2 until the guiding-prongs of plate 2 reach the surface of the boxes to be fastened and have formed the staples. Then the lower beveled end of the hooked strip S strikes upon the beveled end of the opening in the cap-plate and the hook is thrown outward, releasing it from the notch in the plate 5. This arrests the downward motion of the plate 2, the horns are forced back, and the prongs of plate 5 move on downward until they have forced the prongs of the staples through the lapped end of the box. The prongs of the plate 5 are slightly grooved toward the ends to fit the staples. They press the inner face of the staples firmly against the wood, and the ends project through the inner face, where they are bent and clinched, as hereinafter explained. The plate 5 is moved up and down by means of a lever, $p$, pivoted at 21 and worked by a cam, H. The prong-arms of the lever, extending forward on each side of the plate 5, are connected to a cross-piece, 7, as shown in Fig. 1. The cam H is on a shaft, C, and by position and shape is timed to operate the staple mechanism as soon as the strip which forms the box is lapped on the mandrel.

The reel M, which carries the wire, turns on the pin set in the upright standard U. The wires pass from this between feed-rollers. Those marked K are the upper rollers, and they are mounted in slotted standards through shafts, being pressed down by means of the yoke 23, attached to a weighted arm, 24. The lever 25 carries a pawl, 26, which engages in notches in a wheel, 27, fixed on the shaft of the rollers. This lever is connected to one end of a lever, 128, on a post, W, the other end of the lever being connected to the lever T, which is worked by a cam-groove on the main shaft at $t'$. The movement is sufficient to feed the wires forward a distance equal to the length of the wire required for one staple, and it is timed to move the wires forward just before the downstroke of the prongs. A guide-plate, 129, having holes to receive the wires, directs them to the feed-rollers, the holes being in line with half-round grooves in the periphery of the wheels. The lower feed-rollers, $k'$, are connected to the upper by pinions intermeshing, and in order to give a yielding movement to compensate for irregularities in the wire the lower rollers are made of sectional rings set on rubber tubing on the shaft, as shown in Fig. 9. The weighted lever gives sufficient grip upon the wire by its pressure upon the upper roller, the arms 23 being made to fit the shaft of the feed-roller.

In Fig. 6 is also shown the spring Z, which acts as a clamp to hold the lapped ends, that is pivoted at 32, and is connected to the lever

*p* by a link, 33, so that it comes down and holds the lapped ends firmly together while the staples are inserted.

Figure 3:
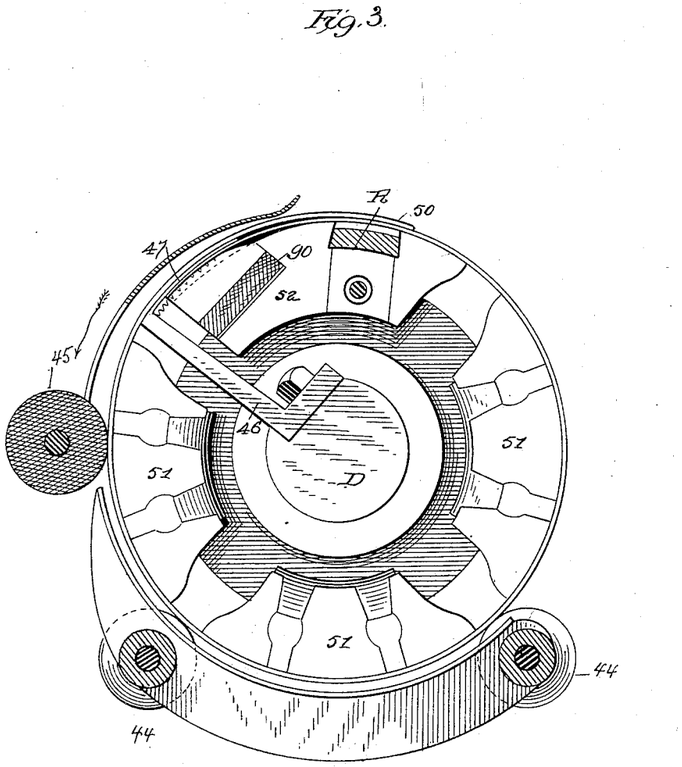
Fig. 3 shows a transverse section of the mandrel.
Figure 4:
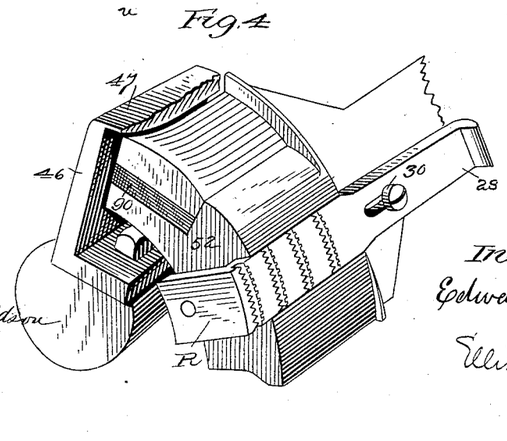
Fig. 4 shows, in perspective, a segment of the mandrel.
Figure 5:
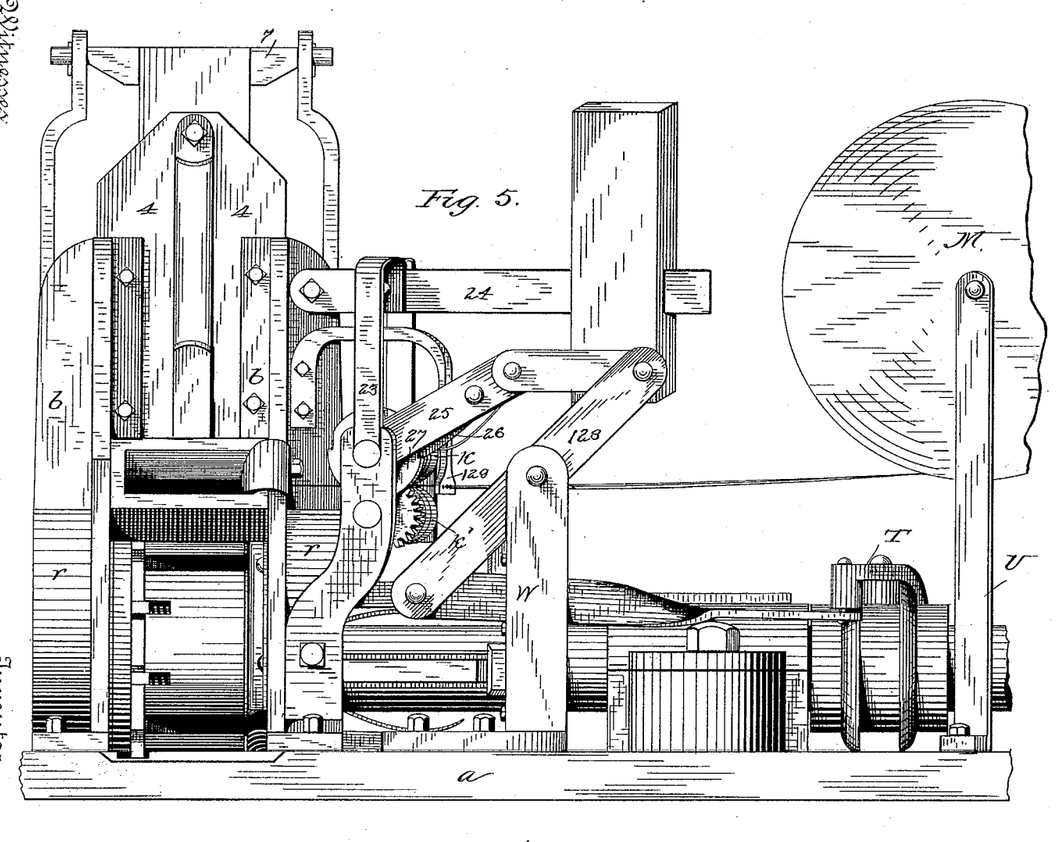
Fig. 5 is a larger front view of the mandrel and stapling devices.

In order that the prongs of the staples may project through without obstruction and be bent over, a clincher, R, is provided in a section of the mandrel, as shown more clearly in Figs. 3 and 4. It consists of a block let into the face of the mandrel, with its surface flush therewith. It has peripheral serrated grooves corresponding in number and position to the slots which hold the staples, so that when the staples are driven they enter these grooves. The clincher is fitted to have limited lateral movement. This motion is imparted to it by means of a lever, S', worked by a cam, *s*, on the main shaft C, Fig. 1. It is necessary to provide for the retreating and advancing movement of the mandrel in making the connection between the clincher and its lever. For this purpose the clincher has an extended arm, 28, Figs. 4, 10, 11, 12, and 13, provided with an upturned projection which engages with a downwardly-turned projection on the arm 29, bolted to the free end of the lever S'. This allows the mandrel to retreat without disturbing the lever S', and the projections engage closely when the mandrel is in an advanced position, so that the lever S' is ready to operate at the proper time. It is timed to operate immediately after the staples are driven, the cam S being set upon the shaft in proper relation with the cam H for this purpose. The lateral movement of the clincher is just sufficient to bend the points of the staples. It is limited by a screw, 30, in a slot in the clincher, and the clincher is returned to its proper position after the lever S is returned by means of a spring-bolt, 31, which is set in a section of the mandrel which carries the clincher and bears against the downwardly-turned flange of the clincher.

It will be understood that the clincher is set upon the mandrel in such position that it will be immediately under the hammer when the rotary movement of the mandrel, after winding on the hoop, has ceased. After the stapling is completed the operation of the machine upon the box is finished, and it remains only to discharge it from its place upon the mandrel. It has been assumed at the outset, in the description heretofore given, that the parts operating the mandrel and the mandrel itself, as well as the bottom of the box and the parts by which it is held, were all in the proper position.

In order to discharge the box, the parts which operate the head and presser-rollers underneath, hereinafter explained, must be removed and the mandrel must be collapsed and retracted.

The movement of the mandrel, both in withdrawing and advancing, is caused by a lever, T, worked by a cam, *t'*, on the main shaft C.

The free end of this lever is connected to the shaft D of the mandrel by means of a grooved collar on the shaft, held so that the shaft may turn therein. The cam *t'* is timed to withdraw the shaft immediately after it is collapsed, which collapsing directly follows the clinching. The withdrawal of the mandrel releases the gate which carries the friction-rollers used to cause the hoop to wind tightly on the mandrel. This gate consists of the frame *u*, pivoted on the main frame at 33, Figs. 2 and 14. It has an arm, 34, which is connected to the treadle 35, by means of which the gate may be swung upward into position. Spurs 36 and 37 on the outside of the gate engage when the gate is swung into position with stop-levers 38 and 39. These levers are connected, as shown in Fig. 14, and are pressed forward by a spring, 40. They are connected by a rod, 41, to a lever, 42, pivoted on the main frame, which lever is connected beneath the shaft D by means of a pin to the same collar to which the lever T is connected, so that the backward movement of the shaft D operates the levers 38 and 39 and withdraws them from the spurs 36 and 37 and lets the frame drop.

On the frame *u* are two rubber-covered friction-rollers, 44, in line with the periphery of the mandrel when the frame is up in position to bear against the hoop and press it to the mandrel as the mandrel turns. The frame is released automatically, but must be applied by the foot, and this is done by the workman as he puts in the material for the box. In addition to these rubber-covered presser-rollers with movable bearings, there is a third back of the mandrel in fixed bearings, (marked 45, Fig. 6.) On the shaft D is a standard, 46, Figs. 3 and 4. This extends to the periphery of the mandrel when it is expanded and has a gripper-plate, 47, serrated underneath. It is curved to form part of the periphery of the expanded mandrel. The mandrel turns in the direction of the arrow in Fig. 3, and the gripper-plate extends backward from its standard. The parts are shown in position to receive the strip in Fig. 6, the strip being marked 50 and being entered under the gripper-plate.

The sections that make up the periphery of the mandrel are marked 51 and 52, the latter differing from the others in points hereinafter explained. It is shown more clearly in Fig. 3. They are also shown in longitudinal section in Fig. 10, which figure also illustrates the collapsing mechanism. The sections are pivoted at 53 on studs secured to the shaft D. An arm, 54, extends from each collapsible segment rearward, and these arms are encircled by a ring, 55, which has friction-rollers bearing upon the outer faces of the arms, and when the ring 55 is moved back the mandrel is expanded by the friction-rollers riding up inclines on the arms. When the ring is moved backward, the springs 56 throw the arms out and collapse the mandrel. The ring is moved by the lever X, connected to it by a pin and friction-roller working in a groove in the periphery of the ring. The lever is operated by a cam, *x'*, on the main driving-shaft C. It is timed to collapse the mandrel as soon as the bottom is inserted, as hereinafter explained, and just before the shaft D begins to retract the mandrel. The segment 52 of the mandrel is recessed across its face in that part underneath the plate 47, and an elastic packing, 90, with a block placed over it, is inserted to fill the recess, the block forming an extension of the periphery of the mandrel, and with the gripping-plate 47 forming an elastic grip into which the hoop or veneer 50 is thrust and by which it is held and drawn forward.

In order perfectly to secure the outer end of the hoop or veneer it is desirable that the staples should be inserted near the edges and clinched; but if the bottom were in place before the stapling operation, the staple on the lower edge of the hoop would be driven into the bottom, and it could not in that case be clinched, and, being necessarily short, it would not hold securely. For this reason the mechanism is so arranged that the bottom is not inserted until the hoop has been nailed. The bottom, which is cut accurately by any suitable machine, is slipped into place from the front and is in the position shown at Y in Fig. 10. It lies against a disk, $y$, which is mounted on the hub 57, adapted to slide longitudinally on the short shaft 58 in line with the mandrel-shaft D. This sleeve is moved by a lever, W, worked by a cam, $w$, on the main driving-shaft C. The sleeve and disk turn on their bearings, and the connection between the lever W and the sleeve is made by pins working in a peripheral groove.

Figures 10, 11, 12, 13:
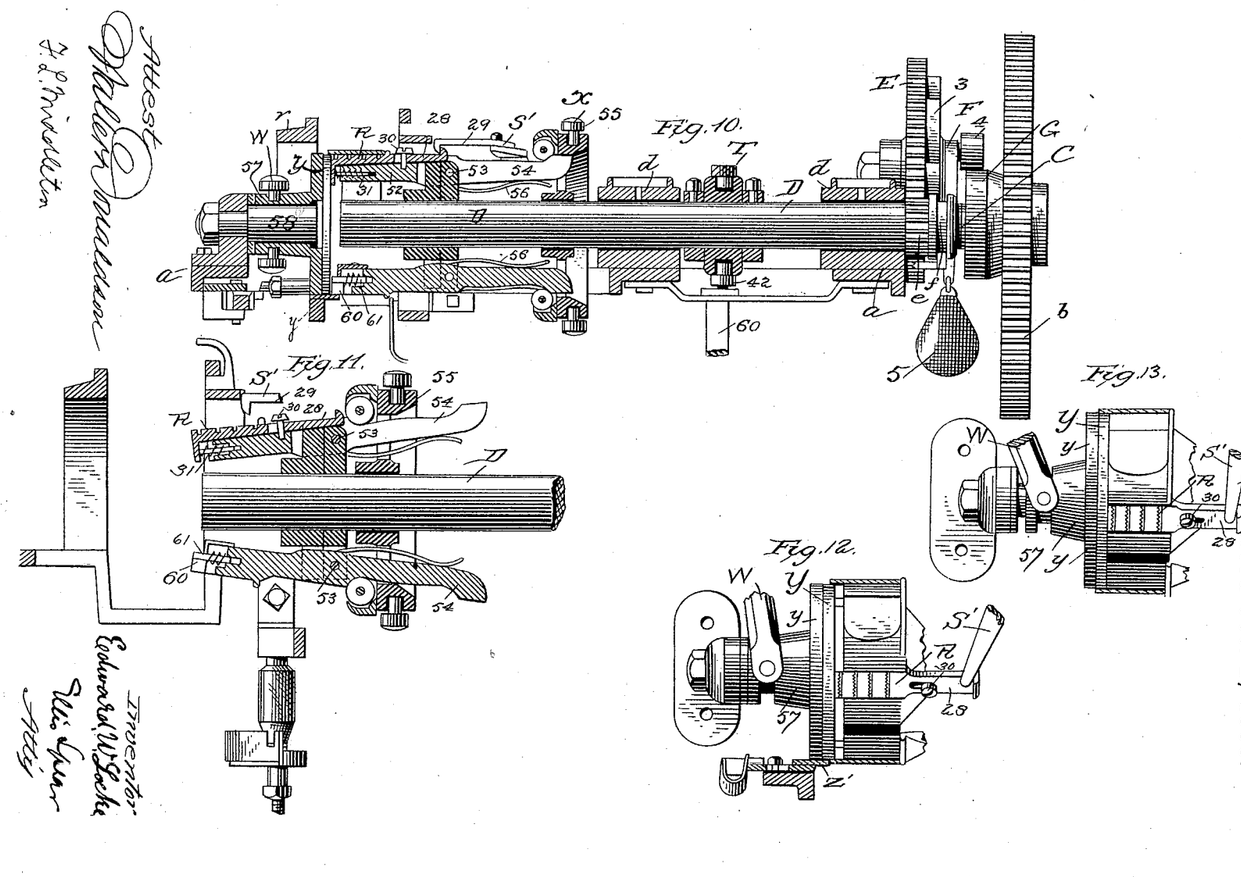
Fig. 10 represents a section along the former-shaft, the former being in position, and the bottom and side strip in place, ready to begin the work.
Fig. 11 represents the position of the former and bottom-support after a box has been completed and discharged.
Figs. 12 and 13 are detached views showing the manner of putting the two parts—the bottom and the side strip—together.

In the ends of the segments 51 are set extension-pieces 60. These extension-pieces are on the pins 61, entered into holes bored longitudinally in the segments. They are held out normally by springs coiled on the pins, and the pieces are on the outside flush with the surface of the mandrel. These extension-pieces, as shown in Fig. 10, bear against the bottom when it is in place and hold it off from the hoop. The disk $y$, against which the bottom rests, is back until the nailing has been performed. Immediately thereafter the cam $w$ throws out the end of the lever attached thereto and pushes in the disk $y$, thus setting the bottom into the hoop. It is arranged to set it in a little beyond the edge, so as to leave a rim extending below the surface of the bottom. In front of the disk $y$ is a guide-plate, $Z'$. It is movable forward and back on pins passing through slots 63 in the plate. It is pressed forward normally by a spring, 64, so as to project over the edge of the disk and the bottom and to form a guide for the hoop. It is thrown back to admit the bottom by means of a lever, $z$, which is connected to the treadle 35, Fig. 2, by means of a link, 65, bell-crank lever 66, and spring-connection 67, so that the guide-plate is thrown back at the same time that the gate is thrown up. The machine is then ready to receive the bottom. It is necessary also that this guide-plate should be thrown back when the box is to be discharged; and to accomplish this automatically the upper arm of the bell-crank lever 66 is connected to the lower end of an arm, 68, and connected to the lever 42, heretofore described. This lever is also connected on the under side to the cam on the shaft D, which reciprocates the mandrel. When the mandrel goes back, the lever 42, through the mechanism described, draws back the guide-plate at the same time that it releases the catches which hold up the gate. The completed box thus released drops into a discharge-chute.

It will be understood that the motion of the machine should be arrested when the parts are exactly in position to commence operations upon the box. This must be automatic in its operation. To accomplish this, the driving-pulley A and pinion B, fixed thereto, are mounted upon a rocking standard connected to a lever, 78, which lever is pivoted at 79 and swings sufficiently upon this pivot in a horizontal plane to throw the pinion B into and out of mesh with the gear-wheel $b$. The free end of the lever is pressed forward constantly by a rope, 80, running over a pulley and connected with a weight, 81, as shown in Fig. 2. This weight would hold the pinion out of gear were the lever 78 not held back sufficiently to keep the gear and pinion in connection by means of a dog, 82. The dog is in the shape of a bell-crank lever and is pressed downward to hold the lever 78 by means of a spring, 83. The lever 78 is connected on the back side to the rope 84, which runs over a pulley to the treadle 85. To start the machine, the operator presses upon the treadle, pulling back the lever, throwing the pinion B into connection with the gear-wheel $b$. At the same time the dog 82 drops in front of the lever 78 and holds it in that position. There is a cam, 86, on the main shaft C, having an abrupt shoulder, and the upper end of the dogging-lever 82 is formed with an offset which bears on the face of this cam. When the offset rides up on the high part of the cam, it removes the dog from the lever 78, when immediately the weight 81 draws forward the lever and disconnects the driving mechanism. This is timed to occur when the mandrel has been advanced and expanded, and is in position to receive a hoop or veneer, and ready to commence the operation on the box. The cam 86 continues its movement far enough after leaving the dog to allow the offset to drop over the abrupt shoulder. Thus the machine is started at the will of the operator, and when once started it goes through with all the operations necessary to form a box and discharge it, and then puts the mechanism in position to commence operations upon another, and it then stops automatically.

Having thus described my invention, what I claim, and desire to secure by Letters Patent, is—

1. In a machine for making coiled-hoop boxes, and in combination, a collapsible mandrel carried upon a shaft having rotary and reciprocal motions, both intermittent, a gate for pressing the hoop to the mandrel, and stapling mechanism, and mechanism for operating these parts, all substantially as described.

2. In combination, in a machine for making coiled-hoop boxes, a collapsible mandrel mounted upon a shaft having intermittent rotary motion and intermittent longitudinally-reciprocating motion, a gate for holding the hoop to the mandrel, a stapling mechanism, a disk for inserting the bottom, and mechanism for operating these parts, all substantially as described.

3. In a machine for making coiled-hoop boxes, and in combination, a collapsible mandrel carried upon a shaft having rotary and reciprocal motions, both intermittent, the said mandrel consisting of the standard having a gripper-plate fixed to the mandrel-shaft, and expansible segments, with mechanism for operating all these parts, substantially as described.

4. In a machine for making coiled-hoop boxes, and in combination, a collapsible mandrel having a standard, 46, with a gripper-plate, 47, expansible segments 51, and an expansible segment, 52, having a recess provided with an elastic packing and block arranged to act in connection with the gripper plate to hold the strip, substantially as described.

5. In combination, a collapsible mandrel carried upon a shaft, D, a lever, T, and an operating-cam, $t'$, therefor on the shaft C, a pinion, $e$, splined on the shaft D, a gear-wheel, E, in mesh with the pinion $e$, and mechanism for imparting to the gear E intermittent motion, substantially as described.

6. In combination, a collapsible mandrel carried upon a shaft, D, a lever, T, and an operating-cam, $t'$, therefor on the shaft C, a pinion, $e$, splined on the shaft D, a gear-wheel, E, in mesh with the pinion $e$, mechanism for imparting to the gear E intermittent motion, a bolt, 6, for holding the gear stationary, and pin 7 on the main shaft C, for releasing said bolt to allow the gear to rotate, substantially as described.

7. In combination, a collapsible mandrel carried upon a shaft, D, a lever, T, and an operating-cam, $t'$; therefor on the shaft C, a pinion, $e$, splined on the shaft D, a gear-wheel, E, in mesh with the pinion $e$, an arm, F, carrying a pawl, 2, adapted to operate on the wheel E, and the cam G on the main driving-shaft C, all substantially as described.

8. In combination with the collapsible mandrel, its shaft D, operating-lever T, and cam $t'$, with the pinion $e$, and intermittingly-moved gear-wheel E, the spring-operating segment-arms of the mandrel, the ring, the lever X, and a cam, $x$, on the main shaft C, for operating the lever X, all substantially as described.

9. In combination with the collapsible mandrel, and in a machine for making coiled hoop boxes, the extension-pieces 60, pressed forward by springs, a disk, $y$, and the lever and cam for operating the same, substantially as described.

10. In combination with the mandrel and mechanism for operating the same, the gate $u$, carrying presser-rollers, treadle mechanism for operating the same, catches for holding the gate in a closed position, and devices for automatically releasing the gate, substantially as described.

11. In combination with the mandrel, the gate $u$, rollers 44, spurs 36 and 37, the locking-levers 38 and 39, the spring 40, the rod 41, a lever, 42, shaft D, and mechanism connected to said lever for reciprocating the shaft D, substantially as described.

12. The guide plate Z, the spring 64, and mechanism for operating the same, in combination with the collapsible mandrel and the disk $y$ and their operating mechanism, all substantially as described.

13. In combination, the guide-plate Z', the spring 64, treadle 35, levers for operating the guide-plate connected to the treadle, shaft D, mechanism for reciprocating the shaft, and the frame 68, connecting the levers and reciprocating mechanism, all substantially as described.

14. In combination with the mandrel and other mechanism for coiling the hoop, suitable stapling mechanism, consisting of the movable horns, the driving and guiding prongs and devices for operating them, and devices for feeding the wire, substantially as described.

15. In combination with the mandrel and other mechanism for coiling the hoop, suitable stapling mechanism, consisting of the movable horns, the driving and guiding prongs and devices for operating them, and devices for feeding the wire, and a clinching mechanism, substantially as described.

16. In combination with the mandrel and mechanism for coiling the hoop thereon, the recessed plate 4, bolted to the standards, the guiding and driving prongs having an angular and stepped arrangement in relation to the recessed plate, the horns carried upon a spring-plate and arranged to project in line with the driving-prongs, and a reel and feed mechanism arranged to feed the wire, substantially as described.

17. In combination with a mandrel and mechanism for coiling the hoop thereon, a plate, 5, arranged to reciprocate between standards on the frame of the machine, a plate, 2, detachably connected therewith, the latter being formed with guiding-prongs and the former with driving-prongs, removable horns arranged in line with the driving-prongs, and devices for detaching the plate 2 from the plate 5, and also devices for pressing back the horns, substantially as described.

18. In combination with the recessed plate 4, the plate 20, the prong-plates 2 and 5, the plate 2 being detachably connected to the plate 5, and mechanism for operating the said parts, and the cap-plate 3, all substantially as described.

19. In combination with the horns, the driving and the guiding prongs having an angular and stepped arrangement, the reel for carrying the wires, with suitable feed mechanism arranged in line with the respective prongs, all substantially as described.

20. In combination with the mandrel and horns $n$, mechanism for coiling the hoop thereon, the plate carrying the bending and guiding prongs having grooves on their inner faces, and the driving-prongs having ribs fitting said grooves, the parts being arranged as described in relation to the horns $n$ and being provided with mechanism for operating them, all substantially as described.

21. In combination with the stapling mechanism and with the collapsible mandrel, the clincher recessed into one of the segments of the mandrel, having grooves adapted to receive the staple-points, and mechanism for giving the clincher lateral movement in relation to the mandrel, substantially as described.

22. In combination with the mandrel, the grooved clincher, the arm 29, the lever S, and the cam $s$, substantially as described.

23. In combination with the gear-wheel $b$ of the described machine, the driving-pulley A and pinion B, mounted on a rocking standard, a pivoted lever, 78, connected thereto, mechanism for pressing the lever forward, the dog 82, treadle mechanism, and mechanism for automatically operating the said dog, all substantially as described.

24. In combination with the mechanism for forming the boxes and mechanism for feeding the wires, a series of guiding and bending prongs, and a series of driving-prongs adapted to drive two or more staples in one frame with one motion, substantially as described.

In testimony whereof I have signed my name to this specification in the presence of two subscribing witnesses.

EDWARD W. LOCKE.

Witnesses:
L. S. PROVIN,
THOS. NESTER.